United States Patent
Schneider et al.

(10) Patent No.: US 10,497,147 B2
(45) Date of Patent: Dec. 3, 2019

(54) METHOD FOR ESTABLISHING A LOCATION RELATIONSHIP BETWEEN A CAMERA AND A HEADLIGHT OF A VEHICLE

(71) Applicant: Dr. Ing. h.c. F. Porsche Aktiengesellschaft, Stuttgart (DE)

(72) Inventors: Christian Schneider, Tuebingen (DE); Sebastian Soehner, Karlsruhe (DE); Sascha Saralajew, Wiernsheim (DE); Constantin Haas, Pulheim (DE); Tim Kunz, Kelkheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 16/167,616

(22) Filed: Oct. 23, 2018

(65) Prior Publication Data
US 2019/0122390 A1   Apr. 25, 2019

(30) Foreign Application Priority Data
Oct. 25, 2017 (DE) .......................... 10 2017 124 955

(51) Int. Cl.
*G06T 7/80* (2017.01)
*G06T 7/521* (2017.01)
(Continued)

(52) U.S. Cl.
CPC .................. *G06T 7/85* (2017.01); *B60Q 1/00* (2013.01); *G06T 7/521* (2017.01); *G06T 7/593* (2017.01);
(Continued)

(58) Field of Classification Search
CPC .. G06T 7/85; G06T 7/521; G06T 7/73; G06T 7/593; G06T 7/13; G06T 2207/10028;
(Continued)

(56) References Cited

U.S. PATENT DOCUMENTS

| | | | | |
|---|---|---|---|---|
| 2009/0008580 A1* | 1/2009 | Luberek | ................. | G02B 27/46 250/559.1 |
| 2013/0279185 A1* | 10/2013 | Totzauer | ................. | B60Q 1/04 362/465 |

(Continued)

FOREIGN PATENT DOCUMENTS

| | | |
|---|---|---|
| DE | 102012007908 A1 | 10/2013 |
| DE | 102013201876 A1 | 8/2014 |
| DE | 202017103797 U1 | 7/2017 |

*Primary Examiner* — Oschta I Montoya
(74) *Attorney, Agent, or Firm* — Leydig, Voit & Mayer, Ltd.

(57) ABSTRACT

A method for determining a location relationship between a camera and a headlight of a vehicle includes positioning the vehicle at a distance in front of a surface exhibiting a calibration pattern, ascertaining the distance between the calibration pattern and the vehicle, projecting a pattern onto the surface using a headlight of the vehicle, and detecting characteristic features in the projected pattern. The method further includes performing the previous steps for at least one additional distance between the vehicle and the surface. In addition, the method includes interpolating positions of detected characteristic features that correspond in each case to one another at the different distances using a linear function, determining an intersection of the ascertained linear functions, and determining the location relationship between the camera and the headlight of the vehicle on the basis of the position of the intersection of the ascertained linear functions relative to the camera.

8 Claims, 2 Drawing Sheets

(51) Int. Cl.
  *G06T 7/73* (2017.01)
  *G06T 7/593* (2017.01)
  *B60Q 1/00* (2006.01)
  *G06T 7/13* (2017.01)
  *F21S 41/153* (2018.01)
  *H04N 13/246* (2018.01)
  *H04N 13/239* (2018.01)

(52) U.S. Cl.
  CPC .............. *G06T 7/73* (2017.01); *F21S 41/153* (2018.01); *G06T 7/13* (2017.01); *G06T 2207/10028* (2013.01); *G06T 2207/20164* (2013.01); *G06T 2207/30244* (2013.01); *H04N 13/239* (2018.05); *H04N 13/246* (2018.05)

(58) Field of Classification Search
  CPC ........... G06T 2207/20164; G06T 2207/30244; H04N 13/246; H04N 13/239; B60Q 1/00; F21S 41/153
  See application file for complete search history.

(56) References Cited

U.S. PATENT DOCUMENTS

| | | | |
|---|---|---|---|
| 2014/0217888 A1* | 8/2014 | Hoffmann | G01M 11/064 315/82 |
| 2016/0210750 A1* | 7/2016 | Singh | G06T 7/80 |
| 2016/0264042 A1* | 9/2016 | Ito | G01M 11/064 |
| 2018/0001814 A1* | 1/2018 | Salter | B60Q 1/085 |

* cited by examiner

METHOD FOR ESTABLISHING A LOCATION RELATIONSHIP BETWEEN A CAMERA AND A HEADLIGHT OF A VEHICLE

CROSS REFERENCE TO RELATED APPLICATIONS

This application claims benefit to German Patent Application No. DE 10 2017 124 955.9, filed Oct. 25, 2017, which is hereby incorporated by reference herein.

FIELD

The invention relates to methods for determining a location relationship between a camera and a headlight of a vehicle.

BACKGROUND

Many motor vehicles nowadays have a fixedly installed vehicle camera (driver assistance camera), which is usually installed in the upper region of the windshield. The vehicle camera is used in the implementation of various driver assistance systems, which are intended to assist the driver in specific driving situations, e.g. night view assist or lane keep assist system. The vehicle camera can be used, inter alia, to implement distance measurement. Here, active triangulation is used, in which a characteristic pattern is projected by the headlight of the vehicle onto a projection surface (scene), such as a building wall or the road. Lighting the scene with structured light of known optical and/or geometric properties constitutes a core feature of active triangulation. The scene, which includes the projection of the characteristic pattern, is imaged by the vehicle camera. The image of the scene is then subjected to image processing to extract the characteristic light pattern from the camera image. By assigning characteristic features in the projected light pattern to the segments of the headlight producing said features (corresponds to solving the correspondence problem), the distance between the vehicle and the light pattern that is projected onto the projection surface can be ascertained.

In order to implement active triangulation in the vehicle with the required accuracy, a corresponding calibration is necessary. As part of the calibration, the geometric relations between the camera and at least one of the two headlights of the vehicle are determined. The calibration is required for determining the basic length in order to ascertain, based thereon, from the intersection between two beams (a light beam producing the respective characteristic feature in the light pattern and a light beam imaging said characteristic feature in the camera) the distance from said intersection. Here, precise calibration of the stereo system of headlight and camera is necessary to ensure accurate distance ascertainment. If the calibration is imprecise or even incorrect, a corresponding calibration error would have a direct effect on the ascertained distance value, which can have devastating consequences in particular on the road.

The calibration of headlight systems is introduced in accordance with customary methods in connection with a projection of high-resolution patterns (e.g. Gray code pattern). However, such patterns cannot be provided even with current LED headlights (multi pixel headlight systems), which have up to 84 individual LED segments (also referred to as pixels), because the resolution is too low to provide such high-resolution patterns.

SUMMARY

In an embodiment, the present invention provides a method for determining a location relationship between a camera and a headlight of a vehicle. The method includes positioning the vehicle at a distance in front of a surface exhibiting a calibration pattern, ascertaining the distance between the calibration pattern and the vehicle, projecting a pattern onto the surface using a headlight of the vehicle, and detecting characteristic features in the projected pattern. The method further includes performing the previous steps for at least one additional distance between the vehicle and the surface. In addition, the method includes interpolating positions of detected characteristic features that correspond in each case to one another at the different distances using a linear function, determining an intersection of the ascertained linear functions, and determining the location relationship between the camera and the headlight of the vehicle on the basis of the position of the intersection of the ascertained linear functions relative to the camera.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
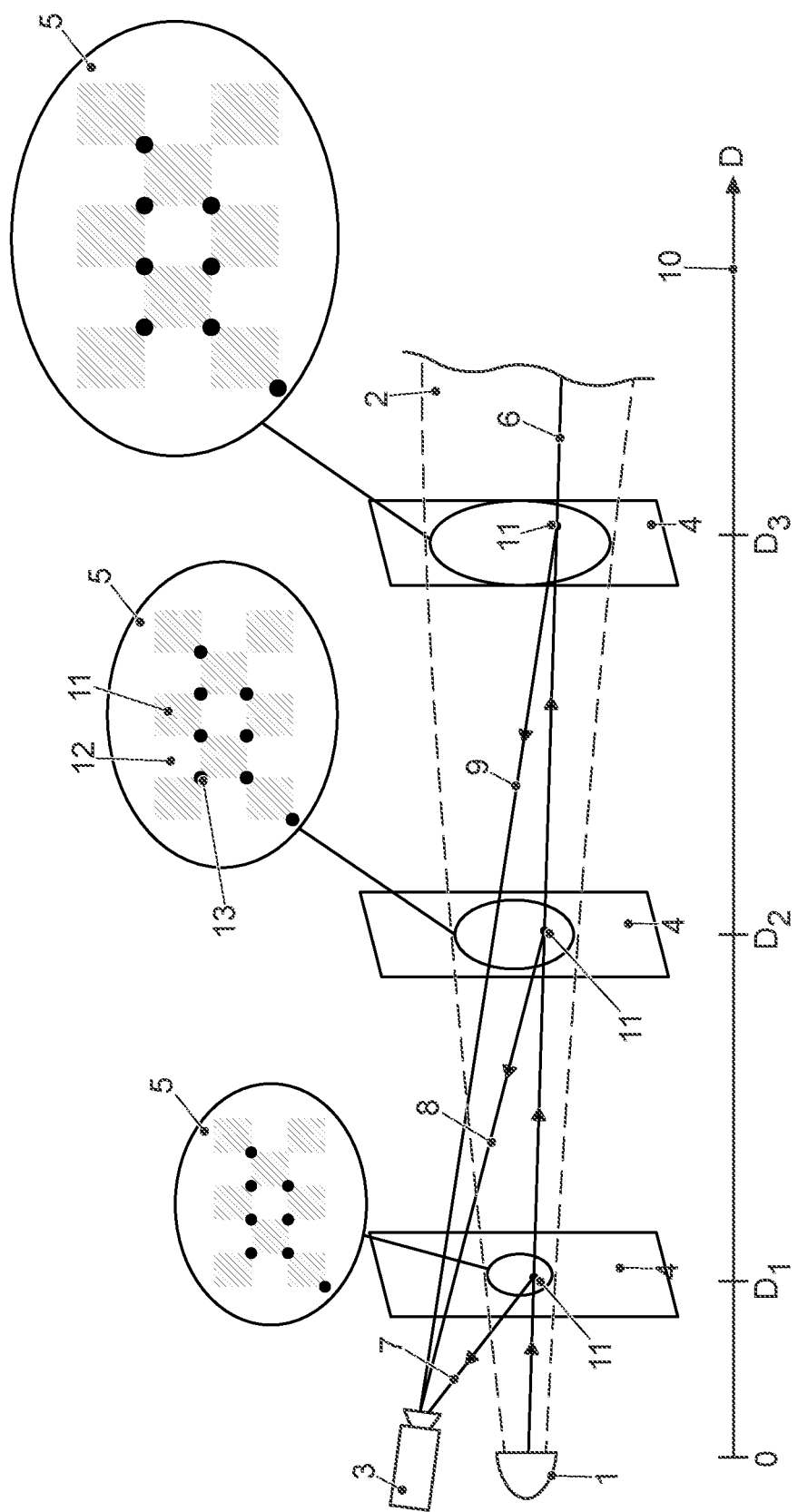
FIG. 1 illustrates the projecting of the characteristic patterns onto projection surfaces which are located at different distances as per a method according to an embodiment of the invention.

Embodiments of the present invention provide suitable calibration methods for determining a geometric location relationship between a camera and headlight in a vehicle.

Methods according to embodiments of the invention can be used to determine a geometric location position between a camera and headlight of a vehicle on the basis of a direct calibration method. To this end, the vehicle is initially aligned with a surface, such as a wall, in a manner such that the vehicle camera can capture the wall. A calibration pattern is situated on the wall. The calibration pattern can exhibit, for example, a chessboard pattern, that is to say a structure including light (light-filled) and dark (non-illuminated) areas arranged in rows on top of or below one another in alternating fashion. An additional camera is attached to the vehicle next to the vehicle camera (driver assistance camera). The location of the additional camera with respect to the vehicle camera is known, and the vehicle camera and the additional camera thus form a calibrated stereo system. The additional camera can, for example, be a luminance camera of the vehicle. The stereo system can be used to determine the distance from the wall by triangulating the calibration pattern, in particular the characteristic features contained therein, such as corner points, end points or edges. The distance from the wall in this phase of the methods is ascertained based on the calibration pattern that is provided on the wall, such that the headlights of the vehicle, the locations of which relative to the vehicle camera are not known, initially do not participate in the distance ascertainment (except for any possible required lighting of the wall). A second camera is here not absolutely necessary, however. The necessary data can also be provided on the basis of PMP or laser measurement.

In a second phase, (at least) one headlight is used to project a characteristic pattern onto the wall. The characteristic pattern can exhibit a projected light pattern that recreates the calibration pattern, i.e. likewise exhibits a chessboard pattern. After being captured by the vehicle camera, characteristic features such as corner points, end points and/or edges can be extracted from the characteristic pattern. The subsequently detected characteristic features are assigned to the distance from the wall, which was ascertained on the basis of the calibration pattern, and stored, for example in a matrix.

Next, the vehicle is positioned at a different distance from the wall and the above-described procedure is performed once more. That means, the stereo system of vehicle camera and the additional camera are used to determine the newly set distance from the wall that includes the calibration pattern, to capture the pattern and to evaluate it in terms of its characteristic features. At the end, the positions of the detected characteristic features in the image of the vehicle camera are assigned to the ascertained distance from the wall and stored, for example in a matrix.

The process of distance ascertainment with respect to the wall on the basis of the calibration pattern, the capturing of the projected light pattern and the detection of the characteristic features contained therein is repeated for a predetermined number of distances, and the characteristic features are assigned to the corresponding distances from the vehicle and stored. Preferably, corner points and/or end points of light areas can be detected in the image of the projected light pattern and the positions thereof can be stored. The corner points and/or end points can correspond to three-dimensional coordinates in the coordinate system of the vehicle camera.

Once a sufficient number of points for the respective distances between wall and vehicle camera have been collected, respectively identical/equivalent points are subjected to linear interpolation. In other words, beams are calculated for points that are situated at equivalent positions within the projected light pattern (for example upper left-hand corner of a light area in row x and column y of the projected light pattern when using a chessboard pattern). Since the projected light pattern remains the same, except for a distance-dependent scaling, said identical/equivalent points of the characteristic light pattern are situated on a beam which originates from a specific segment of the headlight. The beams which are ascertained by linear approximation intersect in a common point, which may be referred to as the focal point of the headlight that is producing the projected light pattern. Since the sites/positions of the corner points and/or end points of structures in the projected light pattern have been captured by the vehicle camera and the respective beams with respect to corner points and/or end points that belong together have been interpolated, the location of the focal point of the headlight relative to the vehicle camera is consequently known.

Since the distance values are typically provided with respect to the vehicle rather than the vehicle camera, the location of the ascertained focal point can be transformed from the coordinate system of the vehicle camera to the coordinate system of the vehicle. To this end, calibration results of the vehicle camera can be used, which indicate the position/location of the vehicle camera in relation to the vehicle.

In a further exemplary embodiment, the pivot point of the headlight can be determined to allow distance measurement for varying angles of the headlight range control (HRC). The pivot point for the headlight range control corresponds to the point at which for example the pitch angle of the headlight is set. A pitch movement is generally performed about one axis. This simplified observation, however, is based on a headlight which is aligned with respect to a horizontal plane extending through the headlight. For this reason, a pitch axis is more simply referred to as the pitch point.

According to one embodiment, a location relationship between a camera and a headlight of a vehicle can include, in a first step, positioning the vehicle at a distance in front of a surface exhibiting a calibration pattern. The calibration pattern can include a pattern with light and dark regions that is arranged on the surface, for example a wall. Positioning the vehicle at a distance from the surface includes setting an (initially unknown) distance between the surface and the vehicle, which can be done by moving the surface, the vehicle, or both relative to one another. In a next step, the method can include ascertaining the distance between the calibration pattern and the vehicle. In a next step, the method can include projecting a pattern onto the surface using a headlight of the vehicle. Here, a subgroup of individual discrete segments of the corresponding headlight, e.g. LED units of an LED matrix headlight, can be activated, and in this way a characteristic pattern can be projected onto the surface. In a subsequent step of the method, characteristic features in the projected pattern can be detected and their positions can be stored. Here, an image processing cascade can be applied to the image that is captured by the vehicle camera, during which the characteristic light pattern is first extracted from the captured image, and subsequently a detection of characteristic features of the characteristic light pattern is performed. In a next step, the just now described steps can be performed for at least one other distance between the vehicle and the surface.

Once the characteristic patterns have been analyzed and the positions of characteristic points that are contained therein have been stored for a number of distances between surface and vehicle, the positions of detected characteristic features that correspond in each case to one another at different distances are interpolated using a linear function in a further step. The ascertained linear functions correspond to beams which are emitted by the corresponding headlight and extend through the same/equivalent characteristic features. In a further step, the intersection of the ascertained linear functions is determined. The intersection can be a focal point of the headlight through which all ascertained linear functions extend. Finally, the location relationship between the camera and the headlight of the vehicle is determined on the basis of the position of the intersection of the ascertained linear functions relative to the camera. The geometric location relationship can be determined, depending on the reference system selected, by the intrinsic and extrinsic parameters of the camera and/or of the headlight.

In accordance with a further embodiment, the steps for recording and storing the positions of the various characteristic features can be performed at a changed pitch angle of the headlight. To this end, it is possible to ascertain, and store, for a number of distances the positions of the characteristic features of distances at a first pitch angle of the headlight and then to ascertain, and store, for a number of distances the positions of the characteristic features of distances at a changed, second pitch angle of the headlight. The same result can also be attained by setting in each case different pitch angles of the headlight at different distances and by capturing and storing for each pitch angle the positions of the characteristic points in the light pattern. By varying the pitch angle of the headlight, the focal points of the ascertained linear functions for different settings of the headlight range control can be taken into account.

In a further embodiment, a method can further include determining a pivot point of the headlight from the linear functions that have been ascertained at different pitch angles. The pivot point of the headlight is understood to mean the point about which the headlight is pivoted to set the pitch angle. In particular, the pivot point can be calculated from the focal points which have been ascertained with respect to the various set pitch angles. The pivot point can be calculated, for example, as the intersection of central beams of the headlight light-emitting surface, for example the LED matrix, at different pitch angles.

In a further embodiment, the calibration pattern can exhibit a pattern having light and dark polygonal areas, preferably a chessboard pattern. The light and dark polygonal areas can include substantially preferably rectangular areas. Light polygonal areas can be produced by individual light-emitting segments, for example by LEDs of an LED matrix headlight. Dark areas situated between the light areas can correspond to switched-off/deactivated light-emitting segments of the headlight.

Even though the chessboard pattern has been used several times as an example, it is of course also possible to use other projected light patterns. However, the chessboard pattern consisting of rows of light and dark areas arranged one above or below the other in alternating fashion represents a pattern having a large number of corner points within the pattern and for this reason can provide a large amount of position information. Corner points are understood to mean, for example, the four corner points of a rectangular light area in a projected light pattern. In particular, the projected light pattern that is used as part of this method can substantially correspond to the calibration pattern. While the calibration pattern can have sharp and high-contrast transitions between light and dark areas, which can be exactly right-angled, such an ideal representation of the projected light pattern by way of the headlight is subject to limits. As compared to the calibration pattern, the real projected light pattern can have blurred transitions between light and dark areas, which can correspond to slightly rounded rectangles.

According to one embodiment, light areas in the projected pattern can be produced by segments of the headlight, wherein the segments can preferably correspond to pixels of an LED matrix headlight.

According to one embodiment, the detected characteristic features can be corner points within the arrangement of light and dark areas of the pattern. In other words, the detected characteristic features can be corner points of the polygonal, in the preferred case of the rectangular, light areas. The corner points can at the same time be considered to be corner points of the adjacent polygonal dark areas.

FIG. 1 illustrates part of a method according to an embodiment of the invention. At the beginning of the method, the vehicle is arranged at a first position in front of a surface or a wall 4. The distances D between different positions of the wall 4 and of the vehicle or one of its headlights 1 are indicated along the axis 10. In the first position, the vehicle, and consequently also the headlight 1, is at a distance $D_1$, in a second position at a distance $D_2$ and in a third position at a distance $D_3$ from the wall 4. A calibration pattern is presented on the wall 4 (not illustrated in FIG. 1). The distance D from the wall 4 is ascertained using triangulation for example by way of a stereo system of the one vehicle camera 3 and an additional camera. The additional camera is not illustrated in FIG. 1. The calibration pattern can include a characteristic structure, for example a chessboard pattern, which is suitable as the basis for the performance of a triangulation method. At this stage of the method, the headlight 1 is not actively used to ascertain the distance D from the wall 4, except for any possible lighting of the scene.

After the distance $D_1$ between headlight 1 and the wall 4 in the first position has been ascertained, the headlight 1 is used to produce a light cone 2, by way of which a characteristic light pattern 5 is projected onto the wall 4. In the present example, the projected light pattern 5 is a chessboard pattern, which can resemble the calibration pattern or correspond to it in a first approximation. The projected light pattern 5 has (light) fields 11 filled with light and (dark) fields 12 devoid of light, although for simplification purposes, the white fields 12 in FIG. 1 are meant to represent the fields which are not illuminated in reality. The vehicle camera 3 is used to record an image of the scene, which also includes an image of the projected light pattern 5. In the region of the wall 4, in which the projected light pattern 5 is situated, an illuminated area 11 is presented in representative fashion. The illuminated area 11 is produced by a generating light beam 6, which is produced, for example, by an LED segment of the headlight 1. A first light ray 7 represents the imaging process of the illuminated area 11 by way of the vehicle camera 3. Once the image of the scene has been captured, image processing is employed to extract the projected light pattern 5 from the image, and characteristic features are detected therein. In the present example, the characteristic features are corner points 13 of the light-filled fields 11 of the projected light pattern 5. As illustrated in FIG. 1, it may be the case that not all corner points 13 in the light pattern 5 are detected. The positions of the detected corner points 13 in the image of the scene are stored, wherein all are assigned to the distance $D_1$ from the wall 4. It should be pointed out that the corner points 13 in FIG. 1 are illustrated as distinct black dots merely for the purpose of providing assistance in order to illustrate an example of the detection of characteristic features. No black dots are, of course, visible at the corners of the light areas in the projection of the light pattern.

After completed detection of the characteristic features in the projected light pattern 5, the distance D between vehicle (and consequently headlight 1) and wall 4 is changed, for example to the distance $D_2$, and the steps just described are performed again. That means, the stereo system of vehicle camera 3 and the additional camera is used to ascertain by triangulation the distance value from the wall 4 using the calibration pattern that is located on the wall 4. Next, the headlight 1 is used to project the characteristic pattern 5 onto the wall 4. The projection of the light pattern 5, in particular the characteristic features contained therein, is captured by way of the vehicle camera 3. The capturing operation of a light area 11 within the light pattern 5 of the wall 4 at the second distance $D_2$ from the vehicle is indicated by the second ray 8. Finally, corner points 13 of the light areas 11 of the projected light pattern 5 are detected and their positions within the captured image are stored, wherein all are assigned to the second distance $D_2$.

Next, the distance D between vehicle and wall 4 can be set to a third distance $D_3$, and the steps described previously are performed again. Capturing a light area 11 within the light pattern 5 that is projected onto the wall is indicated by the third ray 9.

Overall, the method procedure just described can be performed for an expedient arbitrary number of distances D between vehicle and wall 4. The distance D does not have to be set as per the sequence of increasing distances shown in FIG. 1, but can be set as desired from one to the next measurement sequence. At any rate, for each set distance D, characteristic features are detected and their positions are captured. As indicated in FIG. 1, the projection of the light pattern 5 increases in size as the distance between the vehicle and wall 4 becomes greater.

The characteristic features of the light pattern 5 are produced by segments of the headlight 1. It can be seen by the illuminated area 11, which is shown as an example on the walls 4, that it is formed by a generating beam 6, which is emitted by a segment of the headlight 1. This is the case with the further illuminated fields 11 and in particular with the corner points 13 in the projected light pattern 5. Based on the knowledge of the positions of the corner points 13 in the camera image and their distance D from the vehicle camera 1, an interpolation can be performed with respect to each group of identical/equivalent corner points 13 over all captured distances D in order to calculate generating beams for each of said groups. FIG. 1 illustrates a generating light beam 6 coming from the headlight 1, which produces the illuminated area 11 on the wall 4 at various distances d. Identical/equivalent corner points 13 can be understood to mean, for example, all top left-hand, all bottom left-hand, all top right-hand or all bottom right-hand corner points 13 of the same light area 11. Taking into account the rectilinear propagation of the light in free space, the interpolation to ascertain the beams is sensibly performed by way of linear functions. Once the beams have been ascertained, their focal point can be calculated, that is to say a point from which the generating beams theoretically appear to proceed. The focal point can be used for the implementation of the triangulation during driving operation by modeling the headlight 1 as a point light source. The location of the focal point from the view of the vehicle camera 3 is known after this method is completed.

Figure 2:
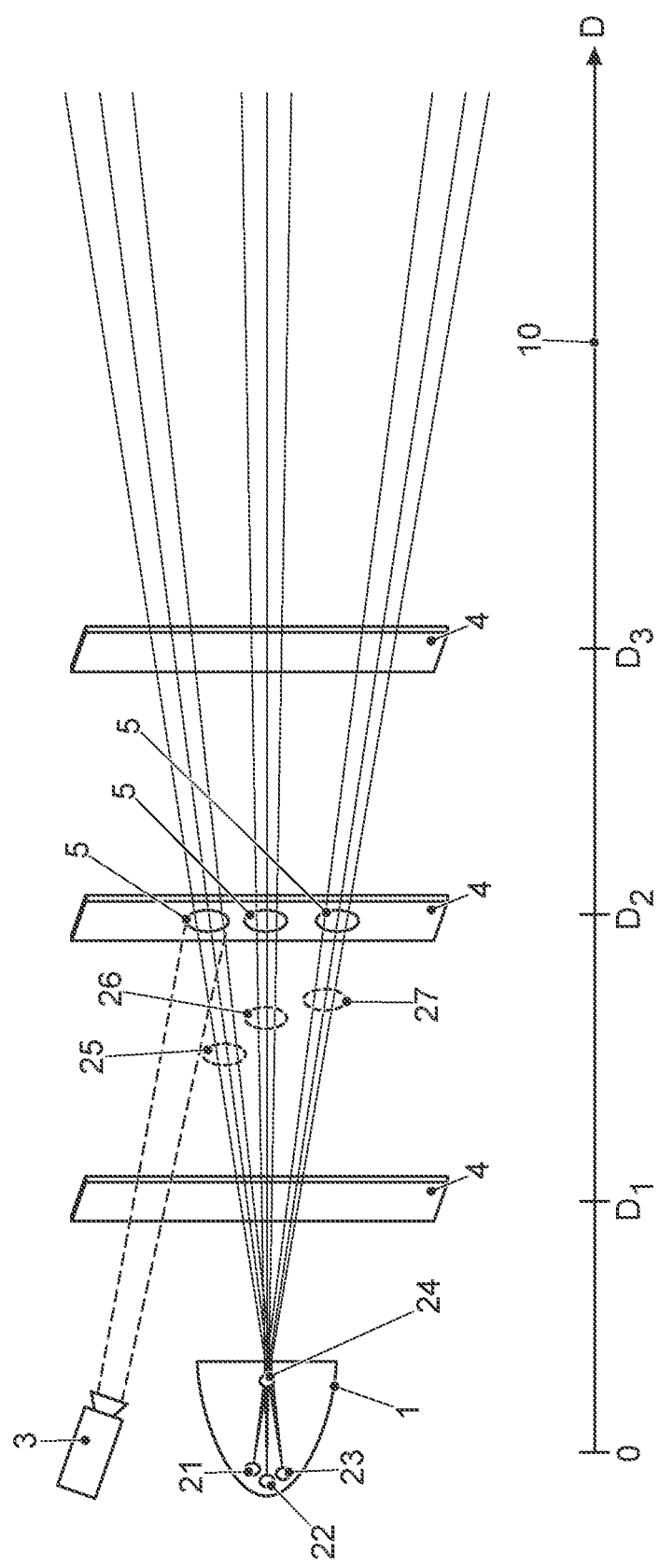
FIG. 2 illustrates the determination of focal points and of the pivot point of the headlight as per a method according to an embodiment of the invention.

The ascertainment of the focal point of a headlight 1 is illustrated in FIG. 2. Illustrated here are the headlight 1 and a calculated first focal point 21 with respect to a first group of generating beams 27, which produce the projected light pattern 5 in a first position on the wall 4, which is situated at the second distance $D_2$ from the vehicle. In a first approximation, the calculation of the beams corresponds to the reconstruction of the beams producing the projected light pattern 5, in particular the corner points thereof. However, it is an approximation because the focal point corresponds to a single point in space, while the real headlight 1, mathematically speaking, does not correspond to a point light source but, in the case of an LED matrix headlight, to a light emission surface.

FIG. 2 furthermore shows aspects for illustrating a developing method according to an embodiment of the invention. Since most modern vehicles have headlight range control, the pitch angle of the headlight 1 can be variably set in adaptation to the respective driving situation. Accordingly, the focal point would have to be ascertained for all angles of the headlight 1 that are settable as part of the headlight range control, but this would involve, according to the already described steps, a complicated and prolonged procedure. Instead, in a further exemplary embodiment, the so-called pivot point of the headlight 1 can be determined. In the cross-sectional views shown in FIGS. 1 and 2, the pivot point 24 corresponds to that point in which the entire headlight 1 pivots. The pivot point 24 is generally known from the construction data (e.g. CAD data) of the headlight 1. However, since these are subject to installation tolerances etc., it may be necessary to determine the pivot point 24 from the measurement data using a suitable method in order to take the actual installation position of the headlight 1 into account.

The pivot point 24 can be calculated from the trajectories of the generating beams with different pitch angles of the headlight 1. That means that the method described with reference to FIG. 1, which was used to ascertain a focal point for a specific configuration of the headlight 1 with respect to the headlight range control, can be performed for other positions of the headlight 1. Illustrated in FIG. 2, next to the first group of generating beams 27, which proceed from the first focal point 21, is a second group of generating beams 26, which proceed from the second focal point 22, and a third group of generating beams 25, which proceed from the third focal point 23. Each group of generating beams 27, 26, 25 corresponds to a different pitch angle of the headlight 1 and consequently to a different headlight range setting. In each headlight range setting of the headlight 1, a projected pattern 5 is produced at a different site of the wall 4, wherein the following description of the method is limited to the wall 4 at the second distance $D_2$ from the vehicle. As indicated in FIG. 2, the projected light pattern 5 migrates vertically on the wall 4, depending on the setting of the headlight range control. The first group of generating beams 27 can, for example, correspond to a pitch angle (headlight range control angle) of +5° relative to a neutral position, the second group of generating beams 26 can correspond to the neutral position of the headlight 1, for example a pitch angle of 0°, and the third group of generating beams 25 can, for example, correspond to a pitch angle (headlight range control angle) of −5° relative to the neutral position. The signs "+" and "−" in the case of angles are arbitrarily chosen, wherein "+" is meant to indicate a headlight 1 which is adjusted downwardly and "−" is meant to indicate a headlight 1 which is adjusted upwardly. From the representatively illustrated profiles of the generating beam bundles 27, 26, 25 that are associated with the three focal points 21, 22, 23, it is possible to approximate the pivot point 24 of the headlight as the intersection of the generating beam bundles 27, 26, 25. To this end, a representative central generating beam can be observed for example for each focal point 21, 22, 23 (central with respect to the light emission surface of the headlight 1). The pivot point 24 of the headlight 1 can be calculated from the intersection of the representative generating beams.

Due to the capturing of the image of the projected light pattern 5 and the characteristic features contained therein (of the corner points 13) for the line interpolation by way of the vehicle camera 1, the total amount of information ascertained due to calculations, such as focal points 21, 22, 23 and pivot point 24, is available relative to the vehicle camera 1, i.e. in the coordinate system of the vehicle camera 1. For this reason, it is possible to form the beams which have been interpolated by way of data of the vehicle camera 1 (by secondary camera calibration) and also generating beams proceeding from the headlight 1 in a coordinate system. However, since the distance values of the active triangulation are usually determined and output relative to the vehicle, the calibration must be performed relative to the coordinate system of the vehicle. Consequently, in a further embodiment of the method, the ascertained reference points for the active triangulation, i.e. the focal points 21, 22, 23 and/or the pivot point 24 of the headlight 1, can be converted from the camera coordinate system into the vehicle coordinate system. This can be done, for example, based on a distance measurement from the rear axle of the vehicle to the wall 4 and the distances D from the vehicle camera 1 to the wall 4, which have already been ascertained as part of the method.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for determining a location relationship between a camera, and a headlight of a vehicle, the method comprising:
   i) positioning the vehicle at a distance in front of a surface exhibiting a calibration pattern;
   ii) ascertaining the distance between the calibration pattern and the vehicle;
   iii) projecting a pattern onto the surface using a headlight of the vehicle, the protected pattern exhibits a pattern having light and dark areas, wherein light areas in the protected pattern are produced by segments of the headlight, wherein the segments correspond to pixels of an LED matrix headlight;
   iv) detecting characteristic features in the projected pattern;
   v) performing steps i) to iv)) for at least one additional distance between the vehicle and the surface;
   vi) interpolating positions of detected characteristic features that correspond in each case to one another at the different distances using a linear function;
   vii) determining an intersection of the ascertained linear functions; and
   viii) determining the location relationship between the camera and the headlight of the vehicle on the basis of the position of the intersection of the ascertained linear functions relative to the camera.

2. The method as claimed in claim 1, further comprising performing steps i) to iv) at a changed pitch angle of the headlight.

3. The method as claimed in claim 2, further comprising determining a pivot point of the headlight about which the headlight is pivoted to set the pitch angle from the linear functions that have been ascertained at different pitch angles.

4. The method as claimed in claim 1, wherein the calibration pattern exhibits a pattern having light and dark polygonal areas.

5. The method as claimed in claim 4, wherein the pattern is a chessboard pattern.

6. The method as claimed in claim 1, wherein, in step ii), the distance is ascertained by triangulation using a further camera that is arranged at the vehicle.

7. The method as claimed in claim 1, wherein, in step iv), the detected characteristic features are corner points within the arrangement of light and dark areas of the pattern.

8. The method as claimed in claim 1, wherein the pattern is a chessboard pattern.

* * * * *